Dec. 10, 1963     W. A. KIRSCH     3,113,654
BOAT LADDER
Filed Aug. 27, 1962

INVENTOR
WILLIAM A. KIRSCH
BY Kimmel & Crowell
ATTORNEYS 3,113,654
BOAT LADDER
William A. Kirsch, 1410 W. Ida St., Stayton, Oreg.
Filed Aug. 27, 1962, Ser. No. 219,550
1 Claim. (Cl. 193—35)

This invention relates to a boat ladder and has as its primary object the provision of a device adapted to facilitate the removal of a boat from the water and loading the same on a boat trailer.

An additional object of the invention is the provision of a device of this character which may be readily and expeditiously attached to or associated with any conventional trailer and employed with any size of boat suitable to be transported on a trailer.

Still another object of the invention is the provision of a device of this character which may be readily employed by a single individual, and by means of which a single individual may load or unload a boat with a minimum of effort and difficulty.

Still another object of the invention is the provision of a device of this character which may be employed with a boat trailer in such manner as to avoid the necessity of running the trailer into the water, and submerging the wheels thereof, as is presently the case in loading small boats.

A further object of the invention is the provision of a device of this character which is readily transportable, and which may be stowed on the trailer, or in the boat carried thereby when not in use, occupying a minimum of space and constituting a relative minimum of weight.

A further object of the invention is the provision of a device of this character which is not damaged by immersion in fresh or salt water, which is sturdy and durable in construction, reliable and efficient in operation, and relatively simple and inexpensive to manufacture.

Still other objects will in part be obvious and in part be pointed out as the description of the invention proceeds and shown in the accompanying drawings wherein.

Similar reference characters refer to similar parts throughout the several views of the drawing.

Figure 1:
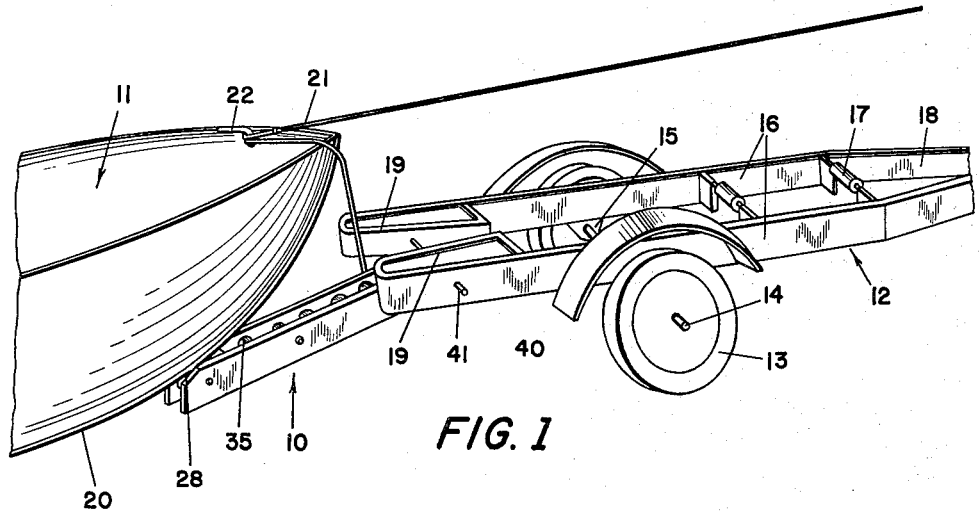
FIGURE 1 is a perspective view of the ladder of the instant invention shown in associated relation with a boat trailer, and a boat to be loaded thereon, portions of the trailer and boat being omitted.

Having reference now to the drawings in detail, and more particularly to FIGURE 1, the device of the instant invention is generally indicated at 10, and is shown in association with a small boat generally indicated at 11, and a boat trailer generally indicated at 12. The trailer is of any desired standard type, and includes rubber wheels 13 mounted on an axle 14 which are supported on frame members 15 from a frame consisting of side bar 16 between which extend suitably mounted rollers 17 of conventional type. The forward end 18 of the trailer is broken away, but includes the usual hitch by means of which it is attached to a towing vehicle such as an automobile or a truck. The rear end of the trailer frame includes a pair of inwardly extending portions 19 which serve normally to guide the keel of a boat into aligned relation with the supporting rollers 17, the keel of a boat being indicated at 20. Loading is normally effected by running the wheels 13 into the water to a depth wherein the keel will float into the space between the members 19, at which time a rope or cable 21 is attached to a suitable cleat 22 on the bow of a boat, and wound in by means of a conventional winch mounted either on the trailer or on the towing vehicle, the winch being not shown.

In order to obviate the necessity of backing the trailer wheels into the water into a position where the keel 20 of the boat will float between the members 19, the ladder 10 of the instant invention is employed. Ladder 10 comprises a pair of side rails 25, which, in this illustrative embodiment of the invention, are comprised of laminated side pieces 26 and 27, which are cut away at one end as at 28, in order to facilitate the insertion of the keel therebetween, or alternatively, in the event that the device is reversed to permit the same to rest upon the bottom, or the ground, at an angle. The opposite ends are also cut away at 29, but at a slightly less angle, to facilitate the positioning of the device between the end pieces 19 of a trailer 12. Side rails 25 are joined by spaced bolts 30, at suitable intervals therealong, the bolts being secured in position by external nuts 31 and washers 32, internal lock nuts, not shown also being provided if necessary. Spacer blocks 30a are also provided.

Figure 2:
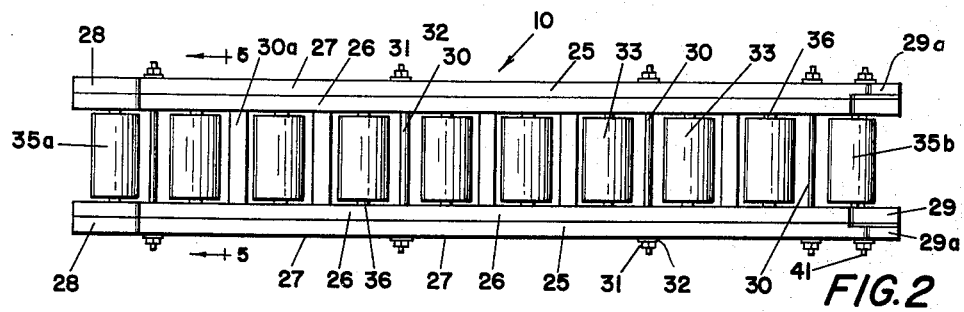
FIGURE 2 is a top plan view of the ladder disassociated from the trailer and the boat.

Rollers 33 are positioned at relatively close intervals along the length of the side rails 25 and extend therebetween, the diameter of the rollers being in excess of the space therebetween, as clearly shown in FIG. 2, the rollers being mounted on fixed axles 36, the latter being secured between the laminated side rails by means of nuts 37, and lock washers 38, if desired. In the arrangement herein shown and described, the ends of the axles are reduced as at 39, to insure the proper positioning between the side rails, with the reduced ends extending between the outer members 27, and the enlarged portions forming shoulders which preclude the inward movement of the rails toward the rollers, and consequent binding thereon. The side rails are of a height materially in excess of the diameter of the rollers and extend thereabove to provide guides for the keel of a boat engaging the rollers.

Any desired number of rollers may be employed, and the rollers may extend in parallelism the full length of the rails, although alternatively if desired, an end roller 35a may be spaced at a lower level, or may be of less diameter than the other rollers to facilitate the loading of a boat. Similarly, the roller 35b of the other end may also be situated at a lower level, or may be of small diameter to enable the boat more expeditously to slide onto the trailer frame and be supported thereby.

Figure 3:
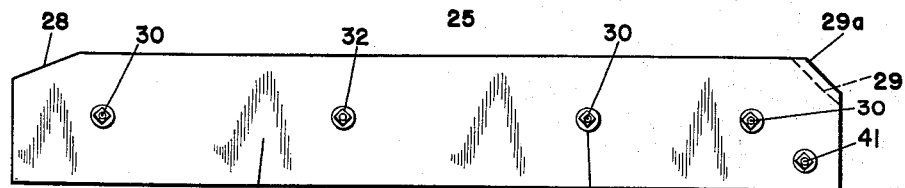
FIGURE 3 is a side elevational view thereof.
Figures 4, 5:
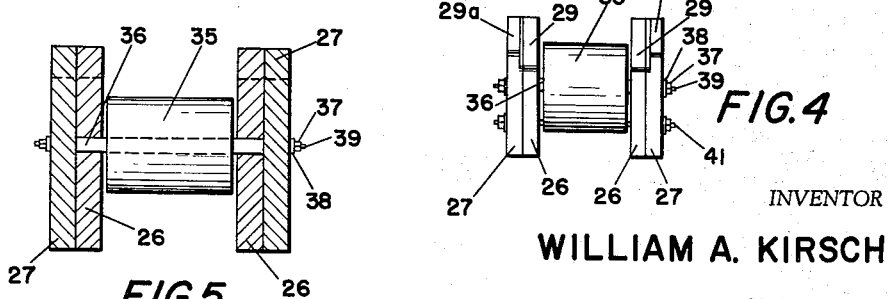
FIGURE 4 is an end elevational view as taken from the left in FIGURE 2.
FIGURE 5 is an enlarged sectional view taken substantially along the line 5—5 of FIGURE 2 as viewed in the direction indicated by the arrows.

As best shown in FIGURES 2 and 3, the cutaway ends 29 may be cut away to a greater degree interiorly than the outer portions 29a, to provide guide ribs or fins on the outer laminations 27, to facilitate directing the keels centrally of the boat trailer.

Any desired means of attachment of the boat ladder to the boat trailer may be provided, although in the illustrative embodiment of the invention aligned openings are extended through the lower part of the side rails below the adjacent rollers, and are adapted to be positioned in alignment with openings 40 in the side walls of the boat trailer, and provided with a pin 41 extended through the aligned openings to hold the boat ladder in association with the boat trailer. Any other desired means, such as hooks, supports, adapters, or other fastening means may be provided properly to position the boat ladder adjacent the rear of the boat trailer so as to enable the boat 20 to be most easily lifted onto the trailer.

From the foregoing the use and operation of the device should be readily understandable. The trailer's back is as close to the water as is practicable, and the ladder 10 is attached thereto by means of the pin 41, in the manner previously described. The cable 21 is attached to the cleat 22, and the winch rotated until the keel 20 extends between the beveled ends 28 and engages the first roller 35a, after which continued pressure exerted on the rope or cable 21 causes the boat to move upwardly with the keel guided directly between the guide members 19 until it rests on the supports 17 of the boat trailer, and is completely supported thereby. At this time the boat may be tied down in the usual manner, the pin 41 removed, and the ladder 10 either positioned in the boat, or fastened to the trailer, or supported in any desired convenient manner for carrying.

From the foregoing it will now be seen that there is herein provided an improved boat ladder which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

We claim:

A boat ladder for use in loading a boat from the water onto a boat trailer comprising a pair of side rails, closely spaced rollers extending transversely between said rails, the space between the rollers being less than the diameter of the rollers, said rollers comprising fixed shafts having reduced ends forming shoulders extending between said rails, the reduced ends extending through bores in said rails, nuts threaded on the projecting ends, said shoulders serving to space said rails, and rollers rotatable on said fixed shafts, and means for attaching one end of the ladder to a boat trailer, said rails being comprised of laminations and secured in parallel relation by transversely extending bolts, the corners of said rails being cut away at one end to facilitate entry of a boat keel therebetween, and the height of said rails being greater than the diameter of said rollers, and extending above said rollers whereby said side rails afford a guide for a boat keel moving over said rollers.

References Cited in the file of this patent

UNITED STATES PATENTS 2,716,499    Grant _____ Aug. 30, 1955

FOREIGN PATENTS 1,200,259    France _____ June 29, 1959